US011432124B2

(12) United States Patent
Ahluwalia

(10) Patent No.: US 11,432,124 B2
(45) Date of Patent: Aug. 30, 2022

(54) STORING TRACKING AREA IDENTITIES ONTO A UNIVERSAL INTEGRATED CIRCUIT CARD IN ADVANCED NETWORKS

(71) Applicant: AT&T Intellectual Property I, L.P., Atlanta, GA (US)

(72) Inventor: Inderpreet Ahluwalia, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 20 days.

(21) Appl. No.: 16/370,291

(22) Filed: Mar. 29, 2019

(65) Prior Publication Data

US 2020/0077244 A1 Mar. 5, 2020

Related U.S. Application Data

(60) Provisional application No. 62/726,040, filed on Aug. 31, 2018.

(51) Int. Cl.
*H04W 4/60* (2018.01)
(52) U.S. Cl.
CPC ..................................... *H04W 4/60* (2018.02)
(58) Field of Classification Search
CPC ....................................................... H04W 4/60
See application file for complete search history.

(56) References Cited

U.S. PATENT DOCUMENTS

| 8,306,518 B1 | 11/2012 | Gailloux et al. |
| 8,408,474 B2 | 4/2013 | Dong |
| 8,472,956 B2 | 6/2013 | Wang et al. |

(Continued)

FOREIGN PATENT DOCUMENTS

| CN | 101754186 A | * | 6/2010 |
| EP | 1 281 284 B1 | | 2/2007 |

(Continued)

OTHER PUBLICATIONS

3GPP, "Technical Specification Group Core Network and Terminals; Characteristics of the Universal Subscriber Identity Module (USIM) application", TS 31.102, V16.0.0, Jun. 2019, 318 pages.

(Continued)

*Primary Examiner* — Muthuswamy G Manoharan
(74) *Attorney, Agent, or Firm* — Amin, Turocy & Watson, LLP

(57) ABSTRACT

Facilitating storage of tracking area identities onto a universal integrated circuit card for advanced networks (e.g., 4G, 5G, and beyond) is provided herein. Operations of a system can comprise storing a first part of a tracking area identifier in a first data structure and a second part of the tracking area identifier in a second data structure. The operations can also comprise designating the second part as first data indicators and second data indicators. Further, the operations can comprise enabling a function for usage by a mobile device based on a setting that corresponds to a first data indicator of the first data indicators and a second data indicator of the second data indicators. The first data indicator and the second data indicator can be selected based on a tracking area identity associated with network devices of a network servicing the mobile device.

20 Claims, 12 Drawing Sheets

(56) References Cited

U.S. PATENT DOCUMENTS

| | | | |
|---|---|---|---|
| 8,489,143 B2 | 7/2013 | Dong | |
| 8,761,832 B2 | 6/2014 | Jeung | |
| 9,026,087 B2* | 5/2015 | Arzelier | H04M 1/72552 |
| | | | 455/414.1 |
| 9,113,318 B2 | 8/2015 | Korkiakoski et al. | |
| 9,155,105 B2 | 10/2015 | Hsu | |
| 9,380,630 B2 | 6/2016 | Youtz et al. | |
| 9,414,220 B2 | 8/2016 | Lee et al. | |
| 9,425,946 B2 | 8/2016 | Pourahmadi et al. | |
| 9,603,189 B2 | 3/2017 | Holtmanns et al. | |
| 9,658,979 B2 | 5/2017 | Sekuru et al. | |
| 9,713,083 B2 | 7/2017 | Toskala et al. | |
| 9,717,063 B2 | 7/2017 | Ali et al. | |
| 9,843,585 B2 | 12/2017 | Haggerty et al. | |
| 9,967,851 B2 | 5/2018 | Cormier et al. | |
| 2002/0065067 A1 | 5/2002 | Khare et al. | |
| 2006/0025115 A1 | 2/2006 | Roy | |
| 2011/0002267 A1 | 1/2011 | Dwyer et al. | |
| 2011/0159893 A1 | 6/2011 | Siomina et al. | |
| 2011/0235574 A1* | 9/2011 | DaSilva | H04W 16/02 |
| | | | 370/328 |
| 2011/0277041 A1 | 11/2011 | Dong | |
| 2012/0003974 A1* | 1/2012 | Nylander | H04W 92/02 |
| | | | 455/435.2 |
| 2012/0106468 A1* | 5/2012 | Engstrom | H04L 61/304 |
| | | | 370/329 |
| 2017/0150341 A1 | 5/2017 | Manalo et al. | |
| 2018/0242229 A1 | 8/2018 | Ahluwalia | |
| 2019/0014515 A1* | 1/2019 | Zee | H04W 48/18 |
| 2019/0223246 A1* | 7/2019 | Huang-Fu | H04W 48/04 |
| 2020/0137528 A1* | 4/2020 | Ai | H04W 72/005 |
| 2021/0144619 A1* | 5/2021 | Prakash | H04W 48/00 |

FOREIGN PATENT DOCUMENTS

| | | |
|---|---|---|
| WO | 00/62573 A1 | 10/2000 |
| WO | 2018/162510 A1 | 9/2018 |

OTHER PUBLICATIONS

Khan, Mohammed Shafiul Alam, "Improving Security and Privacy in Current Mobile Systems", URL: https://pure.royalholloway.ac.uk/portal/files/28843005/2017khanmphd.pdf Royal Holloway, 2017, 230 pages.

3GPP, "Technical Specification Group Core Network and Terminals; Numbering, addressing and identification", TS 23.003, V15.6.0, Dec. 2018, 130 pages.

3GPP, "Technical Specification Group Core Network and Terminals; Non-Access-Stratum (NAS) protocol for Evolved Packet System (EPS)", TS 24.301, V9.0.0, Sep. 2009, 272 pages.

* cited by examiner

| File ID | File Description | File Type | SFI | Read | Update | Number of Records | Length of Records | File Size | Hex Value | Imported Value |
|---|---|---|---|---|---|---|---|---|---|---|
| 6FD4 | Tracking Area PLMN List (TAPL) | TR | N/A | ALW | ADM1 | | 15 | | FFFFFF FFFFFF FFFFFF FFFFFF FFFFFF | |
| 6FD5 | Tracking Area TAC List (TATL) | LF | N/A | ALW | ADM1 | N | 33 | 33N | TBD | Byte 1 = High Byte Indicator Byte 2-33 = Low Byte TAC Bit Map |

FIG. 2

| Identifier: 6FD4 | Structure: Transparent | Optional |
|---|---|---|
| File size: 3n (n ≥ 1) bytes | | Update activity: low |
| Access Conditions:<br>　READ　　　　PIN<br>　UPDATE　　　ADM<br>　DEACTIVATE　ADM<br>　ACTIVATE　　ADM | | |

| Bytes | Description | M/O | Length |
|---|---|---|---|
| 1 to 3 | 1st PLMN (MCC-MNC) | M | 3 bytes |
| 4 to 6 | 2nd PLMN (MCC-MNC) | O | 3 bytes |
| | | | |
| (3n-2) to 3n | nth PLMN (MCC-MNC) | O | 3 bytes |

300

FIG. 3

STORING TRACKING AREA IDENTITIES ONTO A UNIVERSAL INTEGRATED CIRCUIT CARD IN ADVANCED NETWORKS

CROSS-REFERENCE TO RELATED APPLICATIONS

This application claims the benefit of U.S. Provisional Application Ser. No. 62/726,040, filed Aug. 31, 2018, and entitled "STORING TRACKING AREA IDENTITIES ONTO A UNIVERSAL INTEGRATED CIRCUIT CARD IN ADVANCED NETWORKS", the entirety of which is expressly incorporated herein by reference.

TECHNICAL FIELD

This disclosure relates generally to the field of mobile communication and, more specifically, to enabling device functions based on location in wireless communication systems for advanced networks (e.g., 4G, 5G, and beyond).

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G, or other next generation, standards for wireless communication.

BRIEF DESCRIPTION OF THE DRAWINGS

Various non-limiting embodiments are further described with reference to the accompanying drawings in which:

FIG. 2 illustrates an example, non-limiting, representation of descriptions for a tracking area public land mobile network list and a tracking area code list in accordance with one or more embodiments described herein;

FIG. 3 illustrates an example, non-limiting, data structure of a tracking area public land mobile network list in accordance with one or more embodiments described herein;

DETAILED DESCRIPTION

Figure 1:
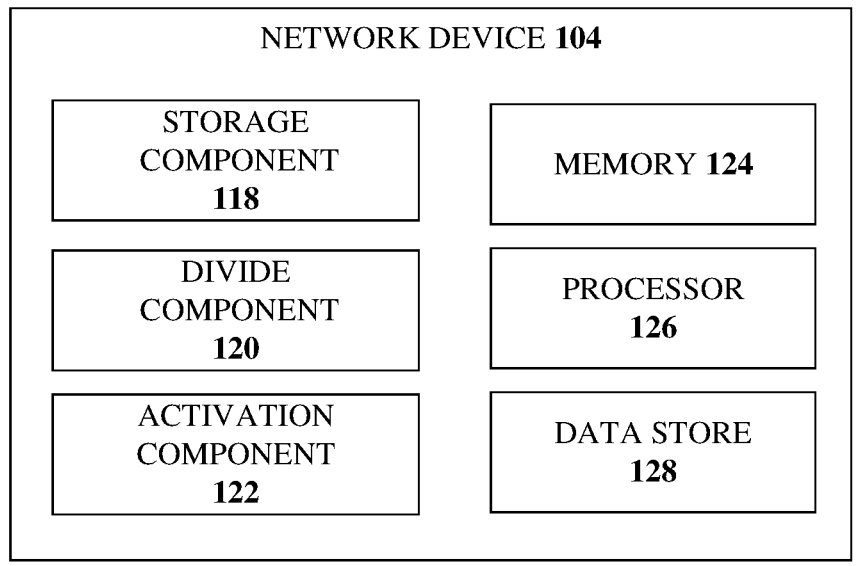
FIG. 1 illustrates an example, non-limiting, system for storing tracking area identities onto a universal integrated circuit card in advanced networks in accordance with one or more embodiments described herein.
Figure 1:
Figure 1:
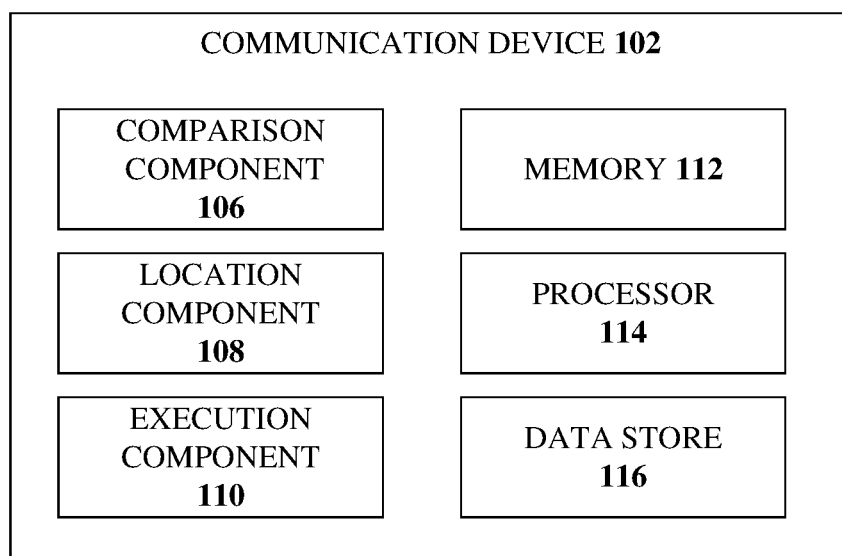

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, computer-implemented methods, articles of manufacture, and other embodiments or implementations that can facilitate storing tracking area identities onto a universal integrated circuit card in advanced networks. More specifically described herein are aspects related to wireless communication systems and activating or deactivating (e.g., turning on or off) one or more user equipment features based on location of the user equipment.

In one embodiment, described herein is a system that can comprise a processor and a memory that stores executable instructions that, when executed by the processor, facilitate performance of operations. The operations can comprise storing a first portion of a tracking area identifier in a first data structure and a second portion of the tracking area identifier in a second data structure. The operations can also comprise designating the second portion as first data indicators and second data indicators. Further, the operations can comprise enabling a function for usage by a mobile device based on a setting that corresponds to a first data indicator of the first data indicators and a second data indicator of the second data indicators. The first data indicator and the second data indicator can be selected based on a tracking area identity associated with network devices of a network servicing the mobile device.

According to an implementation, enabling the function can comprise determining the first data indicator based on a first byte value of the tracking area identity and determining the second data indicator based on a second byte value of the tracking area identity, the first byte value being greater than the second byte value. Further to this implementation, the low byte value can correspond to a tracking area code bit map, and enabling the function can comprise enabling a first function based on a first setting of a bit in the tracking area code bit map. The bit can be determined based on the second byte value. Enabling the function can also comprise enabling a second function based on a second setting of the bit in the tracking area code bit map.

In an example, storing the first portion and the second portion can comprise directing the first portion and the second portion to be stored on a subscriber identification module card of the mobile device.

In accordance with another example, enabling the function can comprise determining a serving tracking area code of the network servicing the mobile device, wherein the serving tracking area code is represented as a first decimal value. Further, enabling the function can comprise converting the serving tracking area code from the first decimal value to a hexadecimal value and using a first part of the hexadecimal value as the first data indicator. Enabling the function can also comprise converting a second part of the hexadecimal value to a second decimal value and using the second decimal value as the second data indicator.

According to another example, the first data structure can be a tracking area public land mobile network list. Further, the second data structure can be a tracking area code list.

In another example, the first data indicator is a byte indicator and the second data indicator is a byte tracking area code bit map associated with the network servicing the mobile device. Further to this example, the byte tracking area code bit map can comprise a group of bits that can be individually set according to the function to be executed for the mobile device based on a determined service area.

In yet another example, the first portion of the tracking area identifier can comprise a mobile country code and a mobile network code. Further, the second portion of the tracking area identifier can comprise a tracking area code.

Another embodiment relates to a method that can comprise matching, by a device comprising a processor, a serving network of a traffic area identity with a list of networks stored in a first data structure, and a servicing tracking area code of the serving network with the traffic area identity stored in a second data structure. The method can also comprise determining, by the device, a first location of a first data indicator and a second location of a second data indicator in the second data structure based on a serving network device. Further the method can comprise implementing, by the device, a function that corresponds to a setting assigned to a bit of a bit map that corresponds to the first location and the second location.

In an example, implementing the function can comprise implementing a first function based on the bit being assigned a first value and implementing a second function based on the bit being assigned a second value.

The method can also comprise, according to some implementations, storing the first data structure and the second data structure on a subscriber identification module card of the device.

In accordance with some implementations, the first data structure can be a tracking area public land mobile network list. Further, the second data structure can be a tracking area tracking area code list. Additionally, or alternatively, the first location of the first data indicator can comprise a mobile country code and a mobile network code, and the second location of the second data indicator can comprise a tracking area code.

Another embodiment relates to a machine-readable storage medium, comprising executable instructions that, when executed by a processor, facilitate performance of operations. The operations can comprise storing a first part of a tracking area identifier in a first data structure and a second part of the tracking area identifier in a second data structure and designating the second part as first data indicators and second data indicators. The operations can also comprise enabling a function on a mobile device based on a setting that corresponds to a first data indicator of the first data indicators and a second data indicator of the second data indicators. The first data indicator and the second data indicator can be selected based on a tracking area identity of a network servicing the mobile device.

In accordance with some implementations, the operations can comprise determining the first data indicator based on a first byte value of the tracking area identity. The operations can also comprise determining the second data indicator based on a second byte value of the tracking area identity. The first byte value is greater than the second byte value.

The second byte value can correspond to a tracking area code bit map and, according to some implementations, the operations can comprise enabling a first function based on a first setting of a bit in the tracking area code bit map. The bit can be determined based on the second byte value. The operations can also comprise enabling a second function based on a second setting of the bit in the tracking area code bit map.

According to some implementations, the operations can comprise determining a serving tracking area code of the network servicing the mobile device, wherein the serving tracking area code is represented as a first decimal value. The serving tracking area code can be converted from the first decimal value to a hexadecimal value. Further, a first portion of the hexadecimal value can be used as the first data indicator. In addition, the operations can comprise converting a second portion of the hexadecimal value to a second decimal value and using the second decimal value as the second data indicator.

The first data indicator can be a byte indicator and the second data indicator can be a byte tracking area code bit map associated with the network servicing the mobile device. Further, the byte tracking area code bit map can comprise a group of bits that are individually set according to the function to be executed for the mobile device based on a determined service area.

In some implementations, a first portion of the tracking area identifier can comprise a mobile country code and a mobile network code. In addition, a second portion of the tracking area identifier can comprise a tracking area code.

The various aspects discussed herein provide a mechanism to store an entirety of Tracking Area Identities (TAIs) on a Public Land Mobile Network (PLMN) or multiple PLMNs on a Universal Integrated Circuit Card (UICC) in an optimized manner such that it is possible for a device (e.g., a user equipment) or an UICC based application to make use of the information.

Referring initially to FIG. 1, illustrated is an example, non-limiting, system 100 for storing tracking area identities onto a universal integrated circuit card in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a communication device 102 and a network device 104. The network device 104 can be included in a group of network devices of a wireless network. Although only a single communication device and a single network device are shown and described, the various aspects are not limited to this implementation. Instead, multiple communication devices and/or multiple network devices can be included in a communications system.

The communication device 102 can include a comparison component 106, a location component 108, an execution component 110, at least one memory 112, at least one processor 114, and at least one data store 116. The network device 104 can include a storage component 118, a divide component 120, an activation component 122, at least one memory 124, at least one processor 126, and at least one data store 128.

With reference now to the communication device 102, the comparison component 106 can be configured to match a serving network of a traffic area identity with a list of networks stored in a first data structure, and a servicing tracking area code of the serving network with the traffic area identity stored in a second data structure. According to some implementations, the first data structure can be a tracking area public land mobile network list. The second data structure can be a tracking area tracking area code list.

The location component 108 can determine a first location of a first data indicator and a second location of a second data indicator in the second data structure based on a serving network device (e.g., the network device 104). For example, the first location of the first data indicator can comprise a mobile country code and a mobile network code. The second location of the second data indicator can comprise a tracking area code.

In addition, the execution component 110 can implement a function that corresponds to a setting assigned to a bit of a bit map that corresponds to the first location and the second location. For example, to implement the function, the execution component 110 can implement a first function based on the bit being assigned a first value and can implement a second function based on the bit being assigned a second value. The first data structure and the second data structure can be stored on a subscriber identification module card of the device, for example.

With reference now to the network device 104, the storage component 118 (or another component of the network device 104, including the at least one data store 128) can be configured to retain portions of at least one tracking area identifier. The first data structure can be a tracking area public land mobile network list. The second data structure can be a tracking area tracking area code list.

According to some implementations, a first portion of a tracking area identifier can be stored in a first data structure and a second portion of the tracking area identifier can be stored in a second data structure. In accordance with various implementations, the portions of the tracking are identifier can be stored in different locations of the storage component 118, for example.

In accordance with some implementations, the first portion of the tracking area identifier can comprise a mobile country code and a mobile network code. In addition, the second portion of the tracking area identifier can comprise a tracking area code.

In some implementations, the storage component 118 can be associated with a subscriber identification module card of the communication device 102. Thus, according to these implementations, the storage component 118 can store the first portion and the second portion by directing the first portion and the second portion to be stored on a subscriber identification module card of the communication device 102.

The divide component 120 can designate the second portion as first data indicators and second data indicators. According to some implementations, the second portion can be stored as a single portion (e.g., a single second portion) or as first data indicators and second data indicators. Further, the activation component 122 can enable a function for usage by a communication device 102 (e.g., the communication device 102) based on a setting that corresponds to a first data indicator of the first data indicators and a second data indicator of the second data indicators. For example, the first data indicator and the second data indicator can be selected based on a tracking area identity associated with network devices of a network servicing the communication device 102.

In an example, the first data indicator can be a byte indicator (e.g., a high byte indicator) and the second data indicator can be a byte tracking area code bit map (e.g., a low byte tracking area code bit map) associated with the network servicing the communication device 102. Further, in some implementations, the low byte tracking area code bit map can comprise a group of bits that are individually set according to the function to be executed for the communication device 102 based on a determined service area.

In some implementations, to enable the function, the activation component 122 can determine the first data indicator based on a high byte value of the tracking area identity. Further, the activation component can determine the second data indicator based on a low byte value of the tracking area identity.

According to an example, the low byte value can correspond to a tracking area code bit map. To enable the function, the activation component 122 can enable a first function based on a first setting of a bit in the tracking area code bit map. The bit can be determined based on the low byte value. Further, the activation component 122 can enable a second function based on a second setting of the bit in the tracking area code bit map.

The activation component 122 can enable the function, according to some implementations, by determining a serving tracking area code of the network servicing the communication device 102. The serving tracking area code can be represented as a first decimal value. Further, the activation component 122 can convert the serving tracking area code from the first decimal value to a hexadecimal value and use a first part of the hexadecimal value as the first data indicator. In addition, the activation component 122 can convert a second part of the hexadecimal value to a second decimal value and use the second decimal value as the second data indicator.

The at least one memory 112 can be operatively connected to the at least one processor 114. Further, the at least one memory 124 can be operatively connected to the at least one processor 126. The memories (e.g., the at least one memory 112, the at least one memory 124) can store executable instructions that, when executed by the processors (e.g., the at least one processor 114, the at least one processor 126) can facilitate performance of operations. Further, the processors can be utilized to execute computer executable components stored in the memories.

For example, the memories can store protocols associated with securely conveying location and other information as discussed herein. Further, the memories can facilitate action to control communication between the communication device 102 and the network device 104 such that the system 100 can employ stored protocols and/or algorithms to achieve improved communications in a wireless network as described herein.

The memories can store respective protocols associated with storing tracking area identities onto a universal integrated circuit card, taking action to control communication between the communication device 102 and the network device 104, such that the system 100 can employ stored protocols and/or algorithms to achieve improved communications in a wireless network as described herein. It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to storing tracking area identities onto a universal integrated circuit card in a communication network. The processors can be processors dedicated to analyzing and/or generating information received, a processor that controls one or more components of the system 100, and/or a processor that both analyzes and generates information received and controls one or more components of the system 100.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 104) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

An advantage of the disclosed aspects is that given the space constraints on a UICC, the disclosed aspects can process the large amount (e.g., 65,536) potential data elements in a timely manner. This approach can be applicable to GSM EDGE Radio Access Network (GERAN (3G)), Universal Terrestrial Radio Access Network (UTRAN (3G)), Evolved Terrestrial Radio Access Network (EU-TRAN (4G)) and Next Generation Radio Access Network (NG-RAN (5G)) and is as much backward compatible as it is forward looking compatible.

From a Radio Access Network (RAN) perspective, all wireless networks, be they 2G, 3G, 4G, or 5G are made up of a Public Land Mobile Network identifier (PLMN ID), Location Area Codes (2G) or Tracking Area Codes (3G, 4G, 5G), and/or Cell IDs. In some cases, it is necessary for a wireless device (also referred to user equipment, mobile device, device, and the like) via an application on the device or on the UICC to perform certain actions based on location. In this case, location is not a Global Positioning System (GPS) position but a location within the cellular network (e.g., a Location Area Code (LAC) and/or a Tracking Area Code (TAC). LACs and TACs are two-byte hexadecimal values ranging from $0001_{hex}$ to $FFFE_{hex}$ (e.g., 0 thru 65,333). In other words, there can be up to a maximum of 65,333 LACs/TACs in a given PLMN. It is noted that that 0000, FFFE are reserved and FFFF is not a valid value per 3GPP TS.23.003.

If an attempt were made to store this information on a UICC, it would occupy approximately 131,000 (131 K) of memory. Given the space constraints on a UICC, this would make it virtually impossible to store the information. In addition, quickly and efficiently trying to process this amount of data in a real-time manner is complex and, if possible, would impact the battery life of a device.

Another challenge is that the UICC file system is not built for this type of storage requirement. A "TRANSPARENT" file can be dimensioned for a large amount of data but is just essentially one long array of data. A "LINEAR FIXED FILE" can be up to 255 bytes long but is limited to 255 records. To overcome the above as well as other challenges, the disclosed aspects provide a manner to store all 65,333 LACs/TACs on a UICC in approximately 8,500 (8.5K) of space in an optimized manner.

A Long-Term Evolution (LTE) TAC is a two-byte value ranging from 0000 to FFFF. As mentioned, 0000 and FFFE are reserved and FFFF is not a valid value. This means that there can be up to 65,533 TACs in a network. According to some implementations, each TAC can be split into a high byte and a low byte approach. The high byte can be assigned at a first level and the low byte can be assigned at a second level. For example, the first level can be market value, which can be a state, a portion of a state, or another defined area. The second level can be a sub-portion of the first level, which can be for example, a city, a town, or another defined area. In an implementation where the high byte is assigned at a market level, there can be 256 markets (00 thru FF). Further, in an implementation where the low byte is assigned at a sub-market level, there can be 253 unique sub-market TACs per each High byte (00 thru 255). It is noted that not all high byte values are used for commercial deployment in some implementations, as some can be reserved for future expansion or future projects and some can be used for other purposes.

Table 1 below is an example of how a few high byte values can be assigned. Each market can be assigned a high byte value and the sub-market can decide on the low byte assignment within their individual sub-markets.

TABLE 1

| High Byte (Hex) | State | Assigned City | TAC Value (Dec) | TAC Start (Hex) | TAC End (Hex) |
|---|---|---|---|---|---|
| 28 | Virginia | Hampton | 10240 to 10495 | 2800 | 28FF |
| 29 | Virginia | Norfolk | 10496 to 10751 | 2900 | 29FF |
| 2A | Virginia | Richmond | 10752 to 11007 | 2A00 | 2AFF |
| 2B | Reserved | Reserved | 11008 to 11263 | 2B00 | 2BFF |
| 2C | Virginia | Alexandria | 11264 to 11519 | 2C00 | 2CFF |

FIG. 2 illustrates an example, non-limiting, representation 200 of descriptions for a tracking area public land mobile network list and a tracking area TAC list in accordance with one or more embodiments described herein. The representation 200 comprises a first column 202 for one or more file identifiers, a second column 204 for one or more file descriptions, and a third column 206 for one or more file types. Also included can be a fourth column 208 for a SF1, a fifth column 210 for READ, a sixth column 212 for UPDATE. Further, included can be a seventh column 214 for the number of records, an eighth column 216 for a length of the records, a ninth column 218 for file size, a tenth column 220 for a hex value, and an eleventh column 222 for an interpreted value.

As illustrated, a file identifier (e.g., the first column 202) for the tracking area public land mobile network list (TAPL) can be, for example, 6FD4. Further, a file identifier (e.g., the first column 202) for the tracking area TAC list (TATL) can be, for example, 6FD5. However, it is noted that other file identifiers can be utilized and these are merely examples. The file type (e.g., the third column 206) for the TAPL can be a transparent file and the file type (e.g., the third column 206) for the TATL can be a linear fixed file. The transparent file can be a block of data and the liner fixed file can be a record-based file.

The number of records (e.g., the seventh column 214) for the TATL indicates the number of records are N, where N is an integer between 0 and 255. Further, the length of records (e.g., the eighth column 216) for the TATL indicates a length of 33. Therefore, the file size (e.g., the ninth column 218) for the TATL is 33N (e.g., N number of records times a length of 33).

The hex value (e.g., the tenth column 220) for the TAPL can be FFFFFF FFFFFF FFFFFF FFFFFF FFFFFF, while the hex value for the TATL can be open and determined later (e.g., To Be Determined (TBD)). Further, the interpreted value (e.g., the eleventh column 222) for the TATL can indicate that the first byte (Byte 1) is a High Byte indicator, and the other bits (e.g., Bytes 2-33) are Low Byte TAC bit map values.

In further detail, a Tracking Area Identity (TAI) comprises a Mobile Country Code (MCC), a Mobile Network Code (MNC), and a TAC. The MCC identifies the country in which the PLMN is located. The value of the MCC is the same as the three-digit MCC contained in the IMSI. The MNC is a code identifying the PLMN in that country. The value of the MNC is the same as the two-digit or three-digit MNC contained in the IMSI. Further, the TAC is a fixed length code (of 2 octets) identifying a Tracking Area within a PLMN. This part of the tracking area identification can be coded using a full hexadecimal representation. The following are reserved hexadecimal values of the TAC: 0000 and FFFE.

The disclosed aspects are configured to store TAIs on the UICC by splitting the TAI into two component parts, the MCC-MNC and the TAC. The MCC-MNC can be stored in one file (e.g., an EF-Tracking Area PLMN List) and the TAC can be stored in another file (e.g., an EF-Tracking Area TAC List).

FIG. 3 illustrates an example, non-limiting, data structure of an EF-Tracking Area PLMN List 300 in accordance with one or more embodiments described herein. The EF-Tracking Area PLMN List 300 can be a transparent file. In an example, the EF-Tracking Area PLMN List 300 can comprise 15 bytes, however, other sizes can be utilized with the disclosed aspects. Further, the EF-Tracking Area PLMN List 300 can control a list of PLMNs (MCC-MNC) that the TAC list in EF-NITL file applies to. In an example, the coding utilized can be defined in 3GPP TS 31.102.

Figure 4:
FIG. 4 illustrates an example, non-limiting, data structure of a tracking area list in accordance with one or more embodiments described herein.

FIG. 4 illustrates an example, non-limiting, data structure of an EF-Tracking Area TAC List 400 in accordance with one or more embodiments described herein. The EF-Tracking Area TAC List 400 can be a linear fixed filed. There can be N records, where N is an integer between 0 and 255 (e.g., maximum of 255 records). A record size can be 33 bytes. Each record can comprise a high byte indicator and a low byte TAC bitmap.

The coding for the high byte indicator can be a one byte value in the range 00-FF, which represents the high byte (byte 1) of the TAC. A HIGH BYTE value of 'FF' does not indicate an EOF (end of file). HIGH BYTE values may be in a non-sequential order. The coding for the low Byte TAC Bit Map can be a 32 byte bit map representation of 256 TACs, where each bit represents the LOW BYTE (byte 2) portion of the TAC associated to the HIGH BYTE Indicator. If bit='1'–UE/applet shall execute F(y). If bit='0'–UE/applet shall execute F(x).

Figure 5:
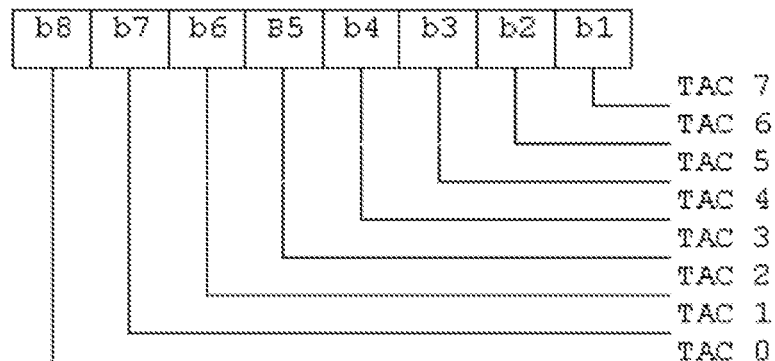
FIG. 5 illustrates an example, non-limiting, pictorial representation of coding a low byte tracking area code bit map in accordance with one or more embodiments described herein.
Figure 5:
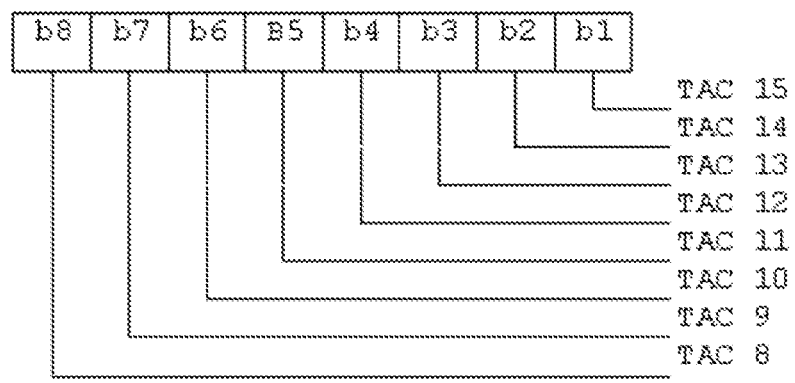
Figure 5:
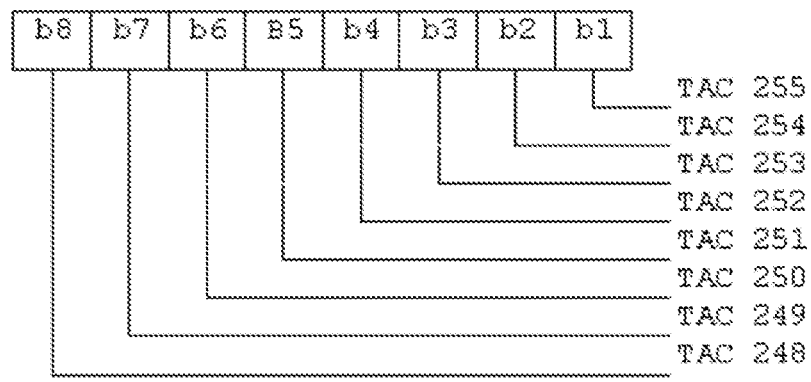

FIG. 5 illustrates an example, non-limiting, pictorial representation 500 of coding a Low Byte tracking area code bit map in accordance with one or more embodiments described herein. The Low Byte tracking area code bit map is a 32 byte bit map representation of 256 TACs. Each bit represents the Low Byte (byte 2) portion of the TAC associated to the High Byte indicator.

Illustrated at 502 is a second byte (Byte 2) and its associated bits (labeled bit 1 through bit 8 (e.g., b1 through b8)). Illustrated at 504 is a third byte (Byte 3) and its associated bits (labeled bit 1 through bit 8 (e.g., b1 through b8)). Further, illustrated at 206 is a thirty-third byte (Byte 33) and is associated bits (labeled bit 1 through bit 8 (e.g., b1 through b8)).

For example, Byte 2, bit 8 (b8) corresponds to TAC 0 and Byte 2, bit 1 (b1) corresponds to TAC 7. Further, Byte 3, bit 7 (b7) corresponds to TAC 9, and Byte 3, bit 3 (b3) corresponds to TAC 12. In another example, Byte 33, bit 5 (b5) corresponds to TAC 250 and Byte 33, bit 4 (b4) corresponds to TAC 251.

If a bit is set to a first value, a first function can be executed. However, if the bit is set to a second value, a second function can be executed. In an example, the first value can be "1" and the second value can be "0." However, in another example, the first value can be "0" and the second value can be "1." In another example, the first function can be function (x) and the second function can be function (y). However, in another example, the first function can be function (y) and the second function can be function (x). Thus, if a bit in TAC position 0 (bit 8) is "0" a first function can be performed. However, if the bit in TAC position 0 (bit 8) is "1" a second function can be performed.

Figure 6:
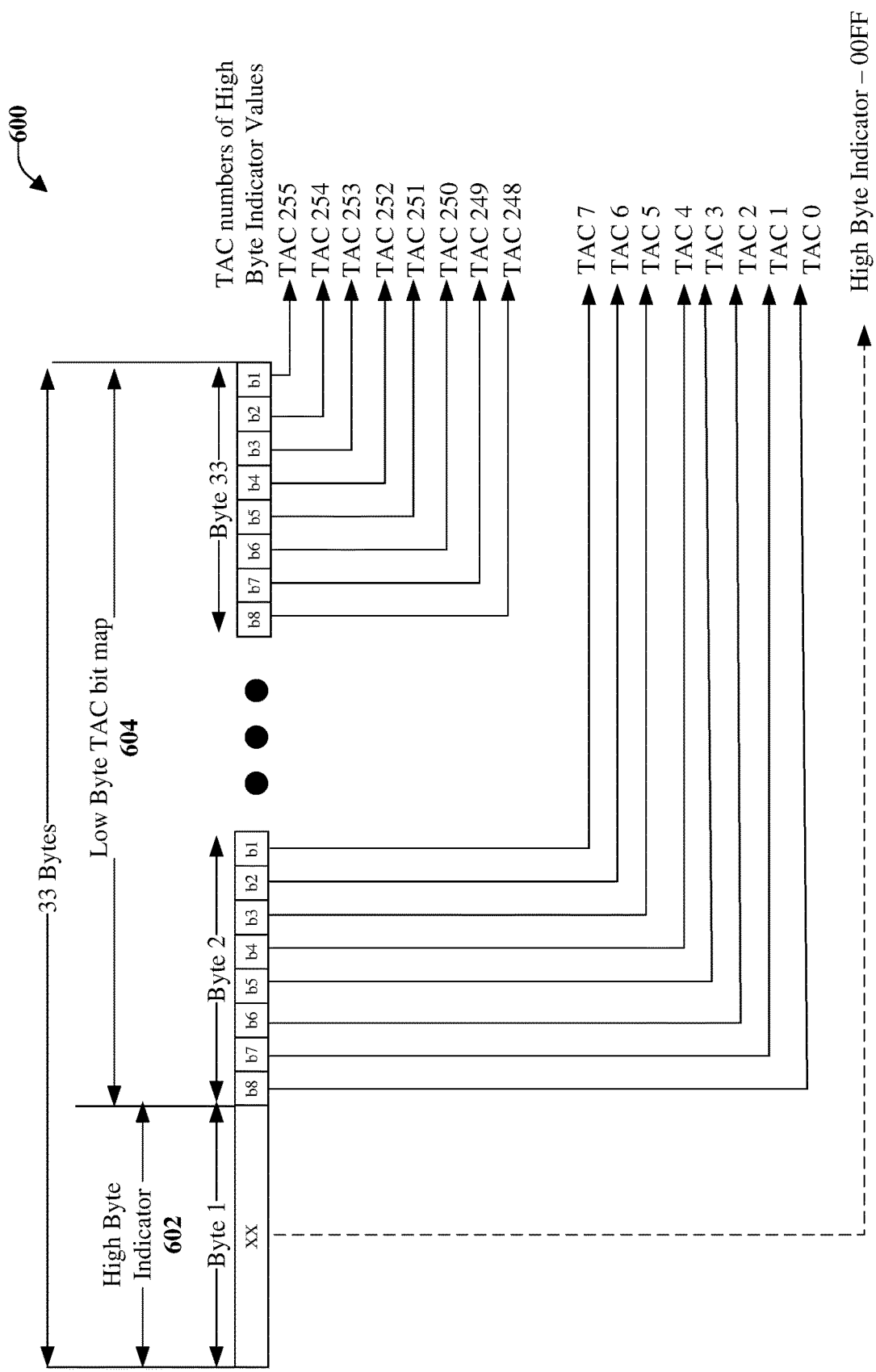
FIG. 6 illustrates an example, non-limiting, pictorial representation of a subscriber identity module file for a tracking area list in accordance with one or more embodiments described herein.

FIG. 6 illustrates an example, non-limiting, pictorial representation of a SIM file for an EF-Tracking Area TAC List (TATL) in accordance with one or more embodiments described herein. Horizontally across the top of the record, from left to right, are thirty-three bytes, labeled as Byte 1, Byte 2, Byte 3, through Byte 33. A High Byte Indicator 602 is Byte 1. A Low Byte TAC bit map 604 can include Byte 2 through Byte 33. The bytes from Byte 2 through Byte 33 are divided into eight bits. For example, Byte 2 is illustrated as being divided into eight bits 1 through 8 (e.g., b1, b2, b3, b4, b5, b6, b7, and b8). Further, Byte 33 is illustrated as being divided into eight bits 1 through 8 (e.g., b1, b2, b3, b4, b5, b6, b7, and b8). The other bytes can be divided in a similar manner.

Each bit represents a TAC value for that position. For example, Byte 2, bit 8 (b8) represents TAC 0 of the High Byte indicator value. In another example, Byte 33, bit 4 (b4) represents TAC 252 of the High Byte indicator value.

It is noted that the High Byte can be 00 all the way through to 0F. The bits can be set though an Over the Air (OTA) signal. As features are enabled in the network based on a tracking area basis, the bit in the individual record can be updated (e.g., flipped from "0" to "1" or from "1" to "0") for the features.

This can be stored on a Sim card and the device can read the Sim card that supports the file system, which can turn on or turn off. This can be updated as the device is moved around and/or through updates such as coverage maps every few months. As network features are enabled, this can be geared toward turning on a feature in the network and having the device do something when it is determined to be located within (or near) that tracking area because that feature has been activated at the network side.

By way of example and not limitation, the following is a TAC coding/decoding example. In this example, the serving TAC is 28,688 (e.g., Kansas City, Mo.). The decimal 28688 is converted to hexadecimal, which is 7010 (e.g., $28688_{dec}=7010_{Hex}$). Thus, in this example, the High Byte is $70_{Hex}$. It is noted that a High Byte value of 70 represents TACs 7000 to 70FF (e.g., 28,672 to 28,927). Further to this example, the Low Bytes is $10_{Hex}$, which is converted from hexadecimal to decimal, which is 16 (e.g., $10_{Hex} \rightarrow 16_{dec}$). TAC 16 corresponds to Byte 4, bit 8, which in this example is set to "0." Therefore, function(x) can be executed by the user equipment located in Kansas City.

In accordance with another TAC coding/decoding example, the serving TAC is 39,163 (e.g., North Dakota). The decimal 39163 is converted to hexadecimal, which is 98 (e.g., $39163_{dec}=98FB_{Hex}$). Thus, in this example, the High Byte is $98_{hex}$. It is noted that a High Byte value of 98 represents TACs 9800 to 98FF (e.g., 38,912 to 39,167). The Low Byte is $FB_{Hex}$, which is converted from hexadecimal to decimal, which is 251 (e.g., $FB_{Hex} \rightarrow 251_{dec}$=TAC 251). TAC 251 corresponds to Byte 33, bit 5, which in this example is set to "1." Therefore, function(y) can be executed by the user equipment located in North Dakota.

Methods that can be implemented in accordance with the disclosed subject matter, will be better appreciated with reference to the various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 7:
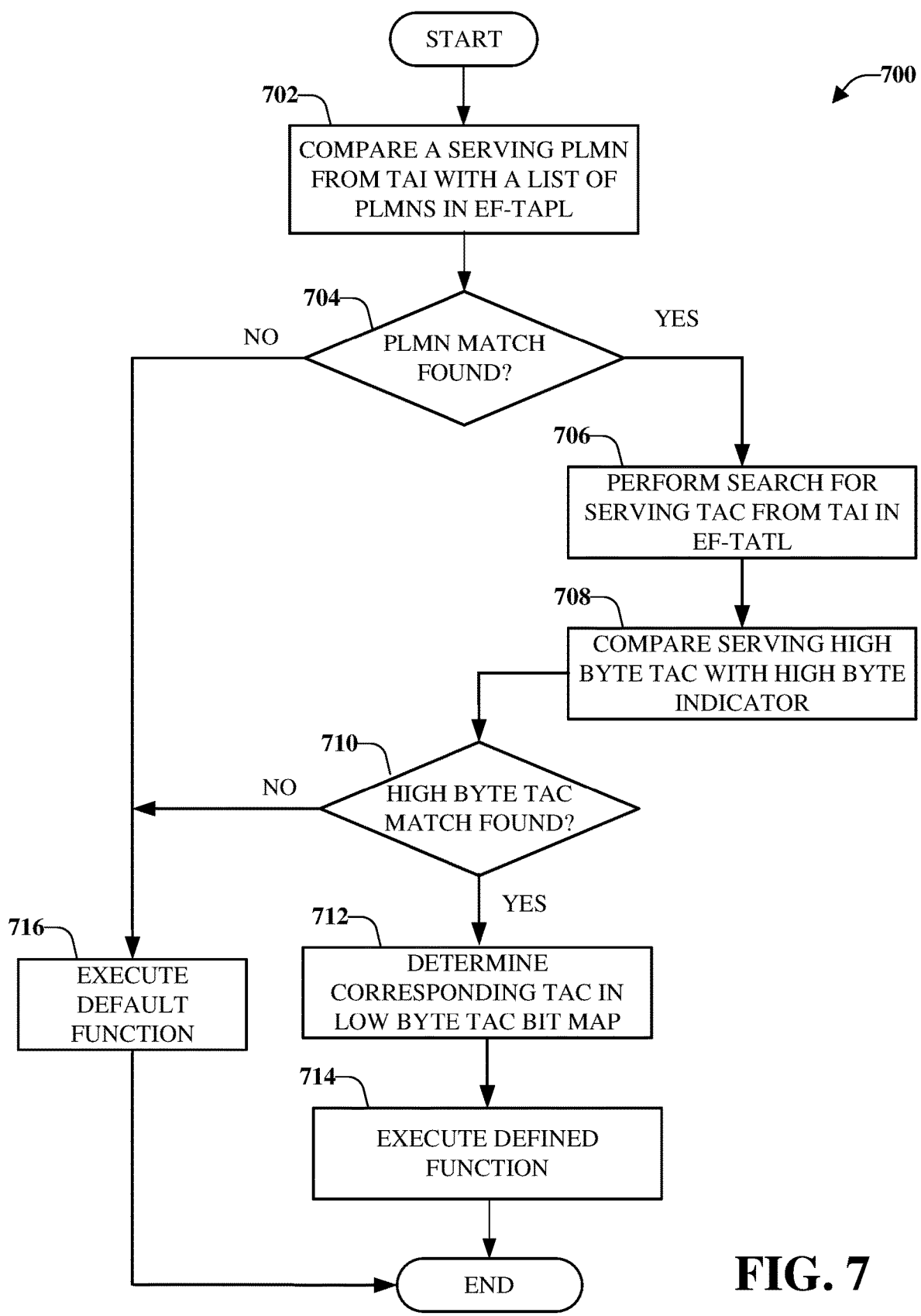
FIG. 7 illustrates an example, non-limiting, computer-implemented method for a user equipment device to perform a function identified in a bit map in accordance with one or more embodiments described herein.

FIG. 7 illustrates an example, non-limiting, computer-implemented method 700 for a user equipment device to perform a function identified in a bit map in accordance with one or more embodiments described herein. Repetitive description of like elements employed in other embodiments described herein is omitted for sake of brevity. The computer-implemented method 700 can be implemented by a mobile device (also referred to as User Equipment (UE)) of a wireless network, the mobile device comprising a processor. Alternatively, or additionally, a machine-readable storage medium can comprise executable instructions that, when executed by a processor, facilitate performance of operations for the computer-implemented method 700.

Upon selecting a new tracking area (TA), the UE can compare the serving TAI with the contents of EF-TAPL and EF-TATL and display the required icon as per the computer-implemented method 700. At 702, the serving PLMN from TAI can be compared with list of PLMNs in EF-TAPL. At 704, a determination is made whether a PLMN match is found. If a PLMN match is found ("YES"), at 706, a search is performed for the serving TAC from TAI in EF-TATL.

A serving High Byte TAC can be compared with the High Byte indicator (Byte 1) of each record in EF-NITL, at 708. Further, at 710 a determination can be made whether a High Byte TAC match is found. If found ("YES"), at 712, the corresponding TAC in the lower byte TAC bit map is determined. Thereafter, at 714, the function can be executed.

For example, if the TAC indicated by Low Byte TAC bit map is equal to "1," the user equipment/applet can execute function(y) or F(y). However, if the TAC indicated by Low Byte TAC bit map is equal to "0," the user equipment/applet can execute function(x) or F(x).

If the PLMN match is not found at 704 ("NO") or if the High Byte TAC match is not found at 710 ("NO"), the user equipment/applet can default to executing a function, at 716. For example, the default can be to execute Function(X). However, in some implementations, Function(Y) is the default and, therefore, the default can be to execute Function (Y). Further, if a PLMN match is not found, at 710, the user equipment/applet can default to executing a function, such as Function(X) or Function (Y), depending on the default function.

Figure 8:
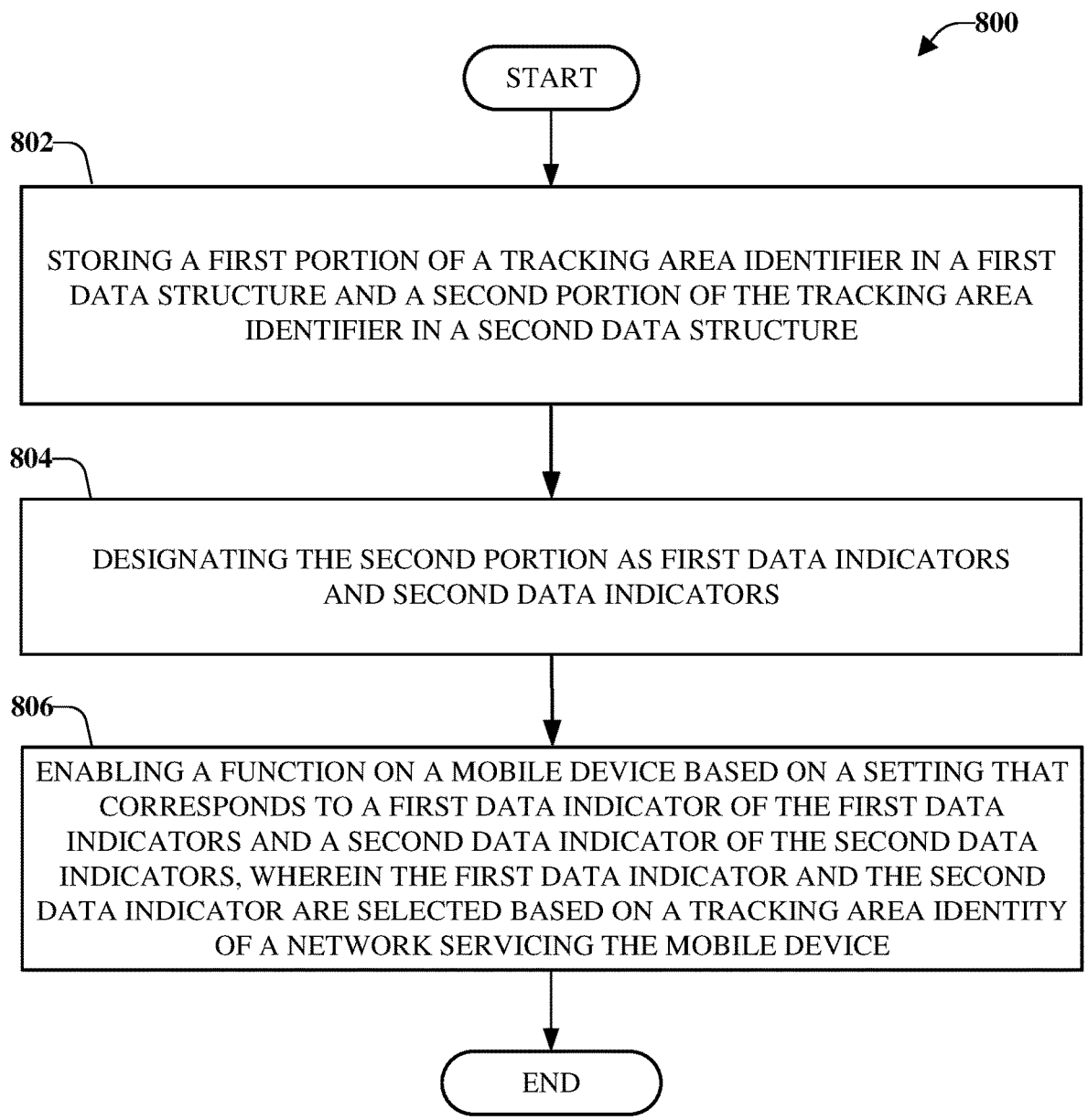
FIG. 8 illustrates an example, non-limiting, computer-implemented method for configuring data structures related to tracking area identities for storage at a mobile device in accordance with one or more embodiments described herein.

FIG. 8 illustrates an example, non-limiting, computer-implemented method 800 for configuring data structures related to tracking area identities for storage at a mobile device in accordance with one or more embodiments described herein. The computer-implemented method 800 can be implemented by a network device of a wireless network, the network device comprising a processor and/or a mobile device of a wireless network, the mobile device comprising a processor. Alternatively, or additionally, a machine-readable storage medium can comprise executable instructions that, when executed by a processor, facilitate performance of operations for the computer-implemented method 800.

At 802, a first portion of a tracking area identifier can be stored in a first data structure and a second portion of the tracking area identifier can be stored in a second data structure (e.g., via the storage component 118). The first portion of the tracking area identifier can comprise a mobile country code and a mobile network code. The second portion of the tracking area identifier can comprise a tracking area code.

The first data structure can be a list of public land mobile networks (e.g., mobile country code and mobile network code. Further, the second data structure can be a tracking area list. Storing the first portion and the second portion can comprise storing the first portion and the second portion on a subscriber identification module card of a mobile device.

The second portion of the tracking area identifier can be designated into first data indicators and second data indicators, at 804 of the computer-implemented method 800 (e.g., via the divide component 120). For example, the first data indicators can be referred to as one or more high byte indicators, wherein each high byte indicator is a one byte value in the range 00-FF, which represents a high byte (byte 1) of the tracking area code (TAC). The second data indicators can be referred to as one or more bits of a low byte tracking area code bit map.

Based on a setting that corresponds to a first data indicator of the first data indicators and a second data indicator of the second data indicators, at 806, a function can be enabled on a mobile device (e.g., via the activation component 122). For example, the first data indicator and the second data indicator can be selected based on a tracking area identity of a network servicing the mobile device.

According to some implementations, enabling the function can comprise determining the first data indicator based on a high byte value of the tracking area identity and determining the second data indicator based on a low byte value of the tracking area identity. Further to these implementations, the low byte value can correspond to a tracking area code bit map and enabling the function can comprise enabling a first function based on a first setting of a bit in the tracking area code bit map or enabling a second function based on a second setting of the bit in the tracking area code bit map. The bit can be determined based on the low byte value.

Figure 9:
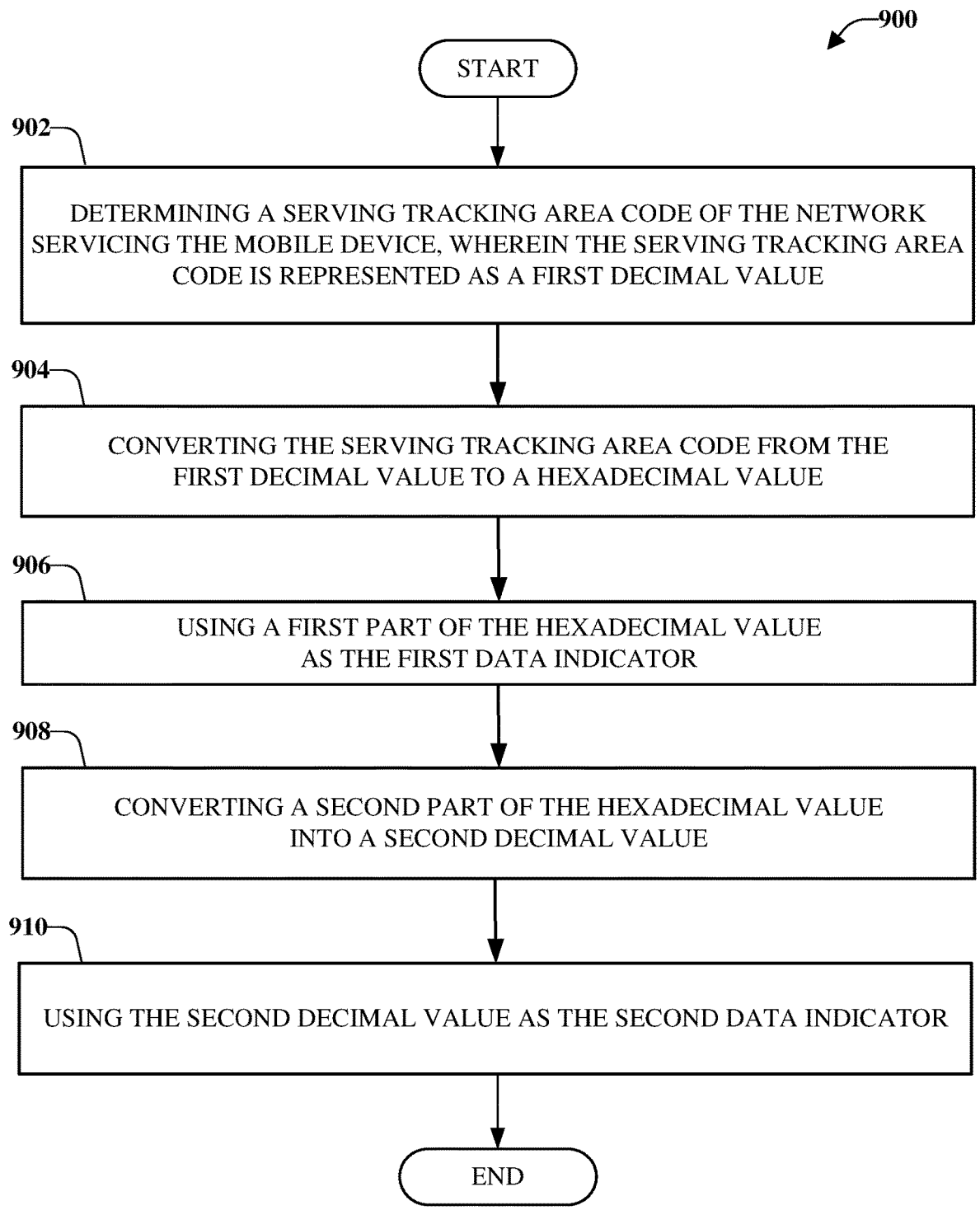
FIG. 9 illustrates an example, non-limiting, computer-implemented method for determining a bit location in a low byte tracking area code bit map in accordance with one or more embodiments described herein.

FIG. 9 illustrates an example, non-limiting, computer-implemented method 900 for determining a bit location in a low byte tracking area code bit map in accordance with one or more embodiments described herein. The computer-implemented method 900 can be implemented by a network device of a wireless network, the network device comprising a processor and/or a mobile device of a wireless network, the mobile device comprising a processor. Alternatively, or additionally, a machine-readable storage medium can comprise executable instructions that, when executed by a processor, facilitate performance of operations for the computer-implemented method 900.

At 902 of the computer-implemented method 900, a serving tracking area code of a network servicing a mobile device can be determined (e.g., via the activation component 122 or another system component). The serving tracking area code can be represented as a first decimal value. The serving tracking area code can be converted from the first decimal value to a hexadecimal value, at 904 (e.g., via the activation component 122 or another system component).

For example, if the serving tracking area code is 29584 decimal, the conversion to hexadecimal could result in the value 7390.

At 906, a first part of the hexadecimal value can be used as the first data indicator (e.g., via the activation component 122 or another system component). In the above value, the first part of the hexadecimal value is 73. Further, at 908, a second part of the hexadecimal value can be converted into a second decimal value (e.g., via the activation component 122 or another system component). In the above example, the second part of the hexadecimal value is 90, which converts to 144 as the second decimal value. Thus, at 910, the second decimal value can be used as the second data indicator (e.g., via the activation component 122 or another system component). The first data indicator can be a high byte indicator and the second data indicator can be a low byte tracking area code bit map associated with the network servicing the mobile device. The low byte tracking area code bit map can comprise a set of bits that are individually set according to the function to be executed for the mobile device based on a determined service area.

Figure 10:
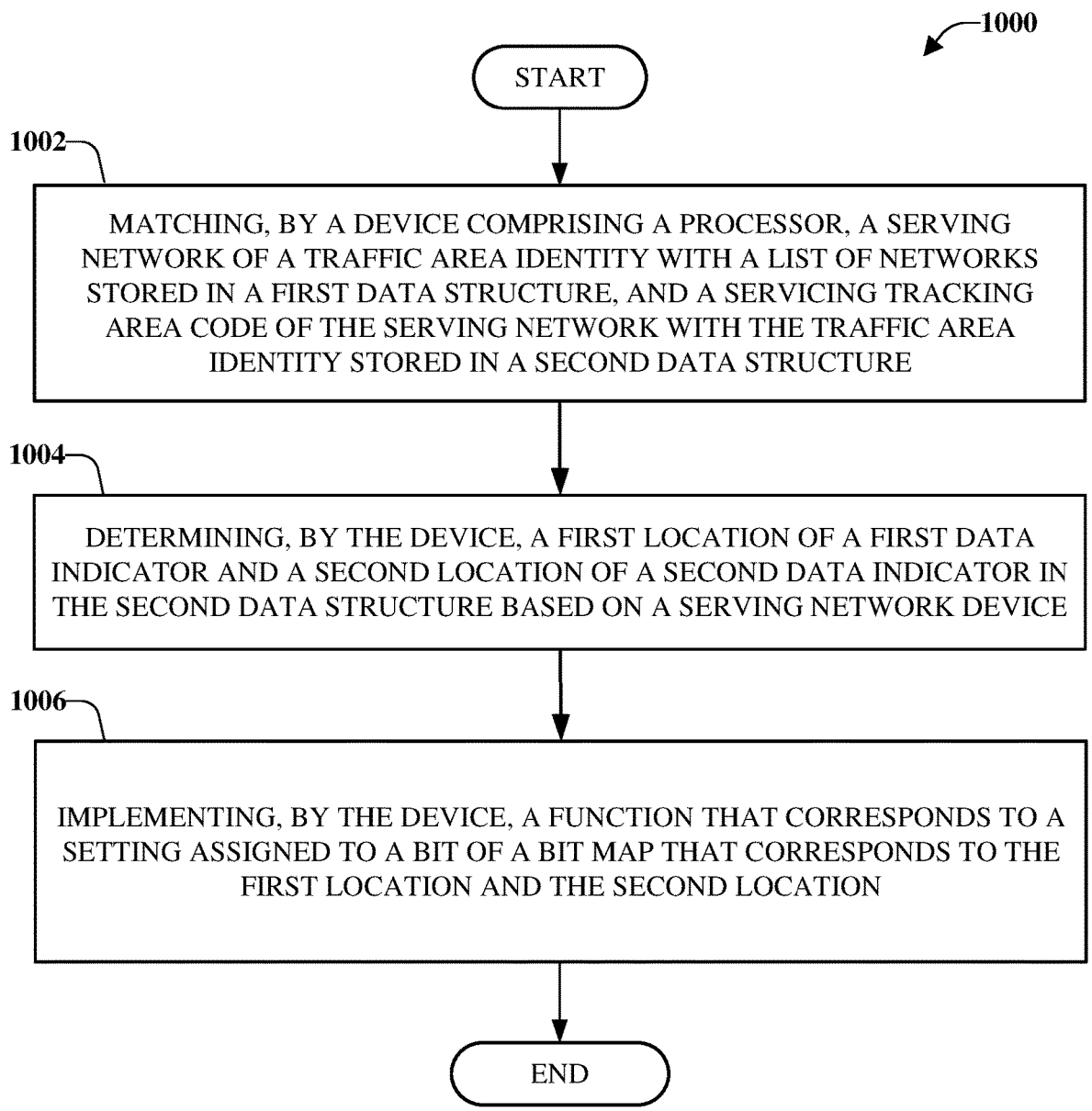
FIG. 10 illustrates an example, non-limiting, computer-implemented method for storing tracking area identities onto a universal integrated circuit card in advanced networks in accordance with one or more embodiments described herein.

FIG. 10 illustrates an example, non-limiting, computer-implemented method 1000 for storing tracking area identities onto a universal integrated circuit card in advanced networks in accordance with one or more embodiments described herein. The computer-implemented method 1000 can be implemented by a mobile device of a wireless network, the mobile device comprising a processor. Alternatively, or additionally, a machine-readable storage medium can comprise executable instructions that, when executed by a processor, facilitate performance of operations for the computer-implemented method 1000.

At 1002 of the computer-implemented method 1000, a device can match a serving network of a traffic area identity with a list of networks stored in a first data structure, and a servicing tracking area code of the serving network with the traffic area identity stored in a second data structure (e.g., via the comparison component 106). According to an implementation, the first data structure can be a tracking area public land mobile network list and the second data structure can be a tracking area tracking area code list.

Further, at 1004 of the computer-implemented method 1000, the device can determine a first location of a first data indicator and a second location of a second data indicator in the second data structure based on a serving network device (e.g., via the location component 108). The first location of the first data indicator can comprise a mobile country code and a mobile network code. The second location of the second data indicator can comprise a tracking area code.

A function that corresponds to a setting assigned to a bit of a bit map that corresponds to the first location and the second location can be implemented by the device at 1006 of the computer-implemented method 1000 (e.g., via the execution component 910). For example, implementing the function can comprise implementing a first function based on the bit being assigned a first value and implementing a second function based on the bit being assigned a second value.

In an example, the computer-implemented method 1000 also can comprise storing the first data structure and the second data structure on a subscriber identification module card of the device.

Described herein are systems, methods, articles of manufacture, and other embodiments or implementations that can facilitate storage of tracking area identities onto a universal integrated circuit card for advanced networks. Facilitating storage of tracking area identities for advanced networks can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, Remote Radio Unit (RRU), Remote Radio Head (RRH), nodes in Distributed Antenna System (DAS) etc.

Cloud Radio Access Networks (cRAN) can enable the implementation of concepts such as Software-Defined Network (SDN) and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of Policy and Charging Rules Function (PCRF) network elements so that policies such as quality of service and traffic management and routing can be synchronized and managed end to end.

Figure 11:
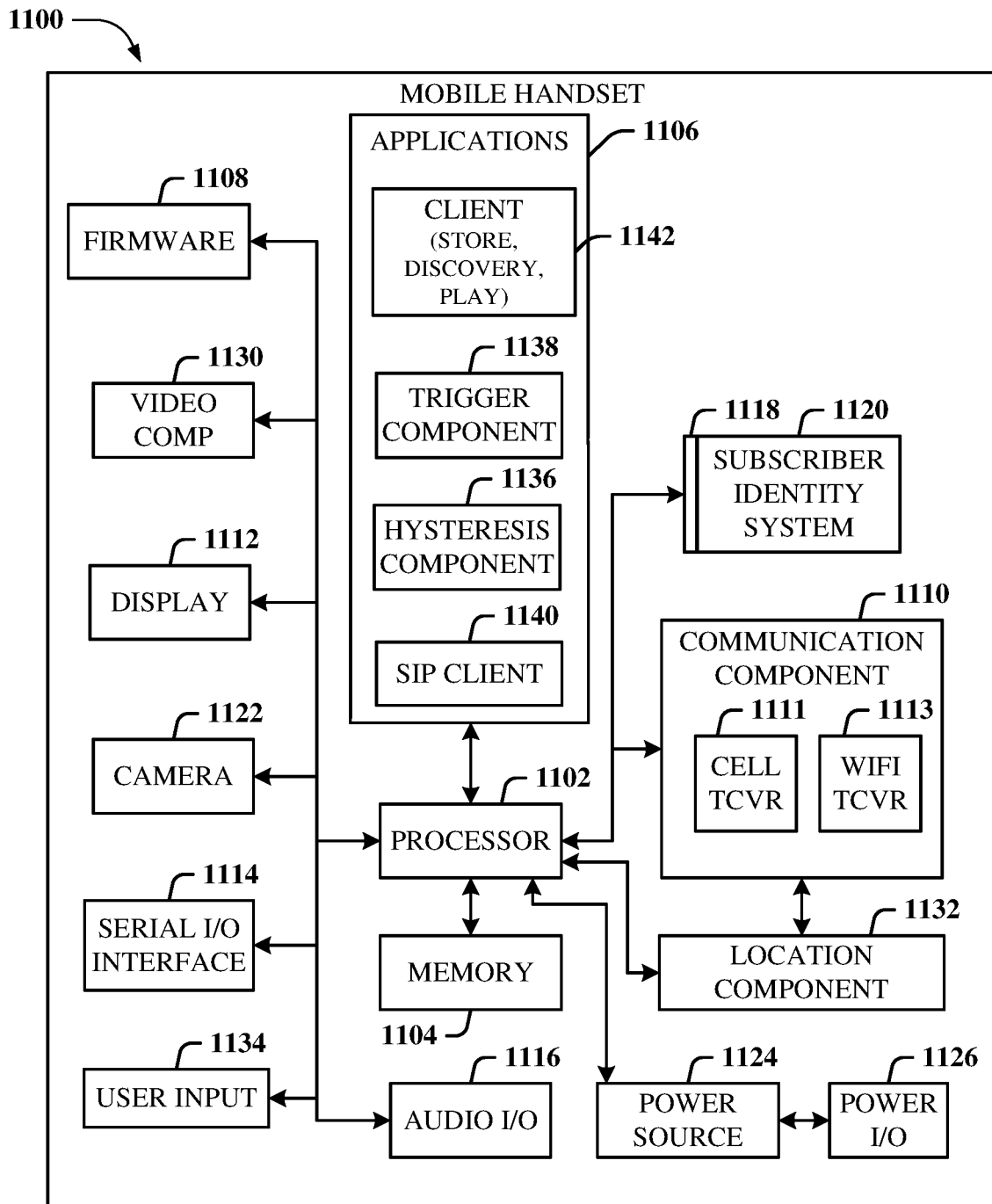
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hard-wire connection, and other serial input devices (e.g., a keyboard, keypad, and mouse). This can support updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touchscreen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
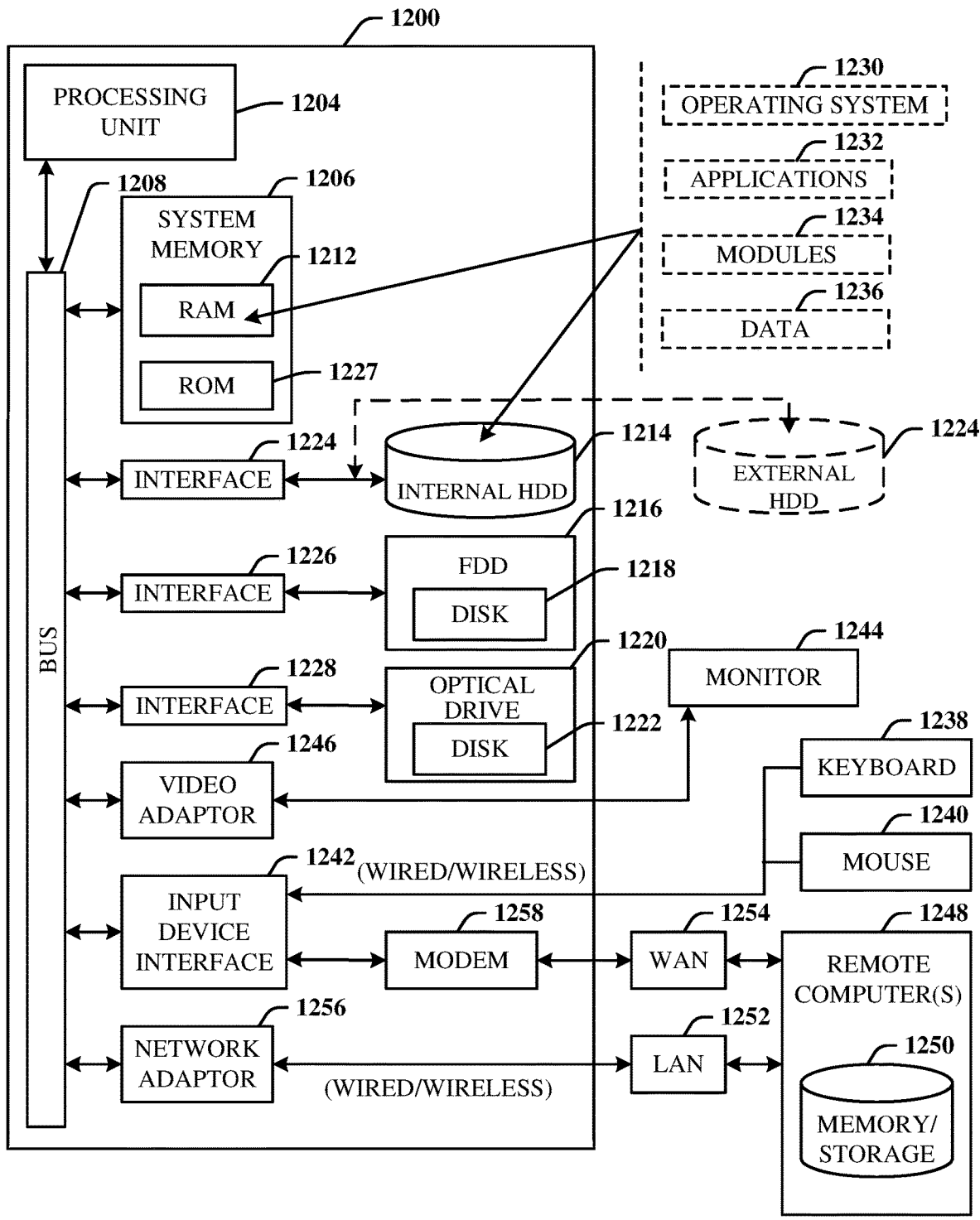
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) can include a microphone, an IR remote control, a joystick, a game pad, a stylus pen, touchscreen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1200 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 9 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, Wireless Fidelity (Wi-Fi), Global System for Mobile Communications (GSM), Universal Mobile Telecommunications System (UMTS), Worldwide Interoperability for Microwave Access (WiMAX), enhanced General Packet Radio Service (enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

Systems, methods and/or machine-readable storage media for facilitating a two-stage downlink control channel for 5G systems are provided herein. Legacy wireless systems such as LTE, Long-Term Evolution Advanced (LTE-A), High Speed Packet Access (HSPA) etc. use fixed modulation format for downlink control channels. Fixed modulation format implies that the downlink control channel format is always encoded with a single type of modulation (e.g., quadrature phase shift keying (QPSK)) and has a fixed code rate. Moreover, the forward error correction (FEC) encoder uses a single, fixed mother code rate of 1/3 with rate matching. This design does not take into the account channel statistics. For example, if the channel from the BS device to the mobile device is very good, the control channel cannot use this information to adjust the modulation, code rate, thereby unnecessarily allocating power on the control channel. Similarly, if the channel from the BS to the mobile device is poor, then there is a probability that the mobile device might not able to decode the information received with only the fixed modulation and code rate. As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a processor; and
a memory that stores executable instructions that, when executed by the processor, facilitate performance of operations, comprising:
dividing a group of tracking area identifiers associated with a mobile network into a first portion and a second portion, wherein the first portion comprises mobile country codes and mobile network codes, wherein the second portion comprises tracking area codes, and wherein the group of tracking area identifiers comprises an entirety of tracking area identifiers associated with the mobile network;
storing the first portion in a first data structure and the second portion in a second data structure, wherein the storing comprises directing the first portion and the second portion to be stored on a subscriber identification module card of a user equipment;
designating the second portion as first data indicators and second data indicators; and
based on a first determination that a first data indicator of the first data indicators and a second data indicator of the second data indicators are included in the first data structure and the second data structure, enabling a defined function for usage by the user equipment, wherein the first data indicator and the second data indicator are selected based on a tracking area identity associated with network equipment of a network servicing the user equipment, and
based on a second determination that the first data indicator is not included in the first data structure, enabling a default function for usage by the user equipment, wherein the enabling of the defined function and the default function are based on the entirety of tracking area identifiers associated with the mobile network being stored on the subscriber identification module.

2. The system of claim 1, wherein the enabling comprises determining the first data indicator based on a first byte value of the tracking area identity and determining the second data indicator based on a second byte value of the tracking area identity, the first byte value being greater than the second byte value.

3. The system of claim 2, wherein the second byte value corresponds to a tracking area code bit map, and wherein the enabling comprises:
enabling a first function based on a first setting of a bit in the tracking area code bit map, wherein the bit is determined based on the second byte value, and
enabling a second function based on a second setting of the bit in the tracking area code bit map.

4. The system of claim 1, wherein the enabling comprises:
determining a serving tracking area code of the network servicing the user equipment, wherein the serving tracking area code is represented as a first decimal value;
converting the serving tracking area code from the first decimal value to a hexadecimal value;
using a first part of the hexadecimal value as the first data indicator;
converting a second part of the hexadecimal value to a second decimal value; and
using the second decimal value as the second data indicator.

5. The system of claim 1, wherein the first data structure is a tracking area public land mobile network list, and wherein the second data structure is a tracking area tracking area code list.

6. The system of claim 1, wherein the first data indicator is a byte indicator and the second data indicator is a byte tracking area code bit map associated with the network servicing the user equipment.

7. The system of claim 6, wherein the byte tracking area code bit map comprises a group of bits that are individually set according to the function to be executed for the user equipment based on a determined service area.

8. The system of claim 1, wherein the user equipment is configured to operate according to a fifth generation wireless network communication protocol.

9. A method, comprising:
facilitating, by a device comprising a processor, storage of a totality of tracking area identities of a public land mobile network as respective portions at a user equipment, wherein the respective portions comprise a public land mobile network list and a tracking area code list, and wherein the facilitating comprises storing the public land mobile network list as a first data structure and the tracking area code list as a second data structure;
matching, by the device, a serving network associated with a traffic area identity with the totality of tracking area identities stored in the first data structure, and a servicing tracking area code of the serving network with the public land mobile network list stored in the second data structure, wherein the first data structure and the second data structure are data structures of a subscriber identification module card of the device;
determining, by the device, a first location of a first data indicator and a second location of a second data indicator in the second data structure based on a serving network device; and
based on a first determination that a setting assigned to a bit of a bit map corresponds to the first location and the second location, implementing, by the device, a defined function; and
based on a second determination that the setting assigned to the bit of the bit map fails to correspond to the first location, implementing, by the device, a default function, wherein the implementing of the defined function and the default function are performed based on the totality of tracking area identities of the public land mobile network being stored on the device.

10. The method of claim 9, wherein the implementing comprises:
implementing a first function based on the bit being assigned a first value; and
implementing a second function based on the bit being assigned a second value.

11. The method of claim 9, wherein the first location of the first data indicator comprises a mobile country code and a mobile network code, and wherein the second location of the second data indicator comprises a tracking area code.

12. The method of claim 9, wherein the device is configured to operate according to a fifth generation wireless network communication protocol.

13. The method of claim 9, wherein the implementing comprises:
   determining, by the device, the first data indicator based on a first byte value of the traffic area identity; and
   determining, by the device, the second data indicator based on a second byte value of the traffic area identity, wherein the first byte value is greater than the second byte value.

14. The method of claim 13, wherein the second byte value corresponds to a tracking area code bit map, and wherein the implementing comprises:
   facilitating implementation of a first function based on a first setting of the bit in the tracking area code bit map, wherein the bit is determined based on the second byte value; and
   facilitating implementation of a second function based on a second setting of the bit in the tracking area code bit map.

15. The method of claim 13, wherein the first data indicator is a byte indicator and the second data indicator is a byte tracking area code bit map associated with a network servicing the user equipment, wherein the byte tracking area code bit map comprises a group of bits that are individually set according to the function to be implemented for the user equipment based on a determined service area.

16. A non-transitory machine-readable medium, comprising executable instructions that, when executed by a processor, facilitate performance of operations, comprising:
   separating tracking area identifiers of a mobile network into first parts and second parts, wherein the first parts comprises mobile country codes and mobile network codes, and wherein the second parts comprises tracking area codes;
   storing the first parts of the tracking area identifiers and the second parts of the tracking area identifiers in a subscriber identification module of a user equipment, wherein the first parts of the tracking area identifiers are stored in a first data structure of the subscriber identification module and the second parts of the tracking area identifiers are stored in a second data structure of the subscriber identification module such that a totality of the tracking area identifiers associated with the mobile network are stored on the subscriber identification module;
   designating the second parts as first data indicators and second data indicators; and
   enabling a first function on a mobile device based on a setting that corresponds to a first data indicator of the first data indicators and a second data indicator of the second data indicators, wherein the first data indicator and the second data indicator are selected based on a tracking area identity of a network servicing the mobile device; and
   enabling a second function on the mobile device based on the setting failing to correspond to the first data indicator, wherein the enabling of the first function and the second function is based on an entirety of tracking area identifiers associated with the mobile network being stored on the subscriber identification module.

17. The non-transitory machine-readable medium of claim 16, wherein the operations further comprise:
   determining the first data indicator based on a first byte value of the tracking area identity; and
   determining the second data indicator based on a second byte value of the tracking area identity, wherein the first byte value is greater than the second byte value.

18. The non-transitory machine-readable medium of claim 17, wherein the second byte value corresponds to a tracking area code bit map, and wherein the operations further comprise:
   enabling the first function based on a first setting of a bit in the tracking area code bit map, wherein the bit is determined based on the second byte value; and
   enabling the second function based on a second setting of the bit in the tracking area code bit map.

19. The non-transitory machine-readable medium of claim 16, wherein the operations further comprise:
   determining a serving tracking area code of the network servicing the mobile device, wherein the serving tracking area code is represented as a first decimal value;
   converting the serving tracking area code from the first decimal value to a hexadecimal value;
   using a first portion of the hexadecimal value as the first data indicator;
   converting a second portion of the hexadecimal value to a second decimal value; and
   using the second decimal value as the second data indicator.

20. The non-transitory machine-readable medium of claim 16, wherein the first data indicator is a byte indicator and the second data indicator is a byte tracking area code bit map associated with the network servicing the mobile device, and wherein the byte tracking area code bit map comprises a group of bits that are individually set according to the function to be executed for the mobile device based on a determined service area.

\* \* \* \* \*